US009010267B2

(12) United States Patent
Katsumata

(10) Patent No.: US 9,010,267 B2
(45) Date of Patent: Apr. 21, 2015

(54) CENTER-LESS POINTER TYPE DISPLAY APPARATUS

(75) Inventor: Yasuhiro Katsumata, Shimada (JP)

(73) Assignee: Yazaki Corporation, Tokyo (JP)

( * ) Notice: Subject to any disclaimer, the term of this patent is extended or adjusted under 35 U.S.C. 154(b) by 304 days.

(21) Appl. No.: 13/696,123

(22) PCT Filed: May 12, 2011

(86) PCT No.: PCT/JP2011/060995
§ 371 (c)(1), (2), (4) Date: Nov. 5, 2012

(87) PCT Pub. No.: WO2011/142435
PCT Pub. Date: Nov. 17, 2011

(65) Prior Publication Data

US 2013/0055947 A1 Mar. 7, 2013

(30) Foreign Application Priority Data

May 12, 2010 (JP) ................................ 2010-110476
Oct. 14, 2010 (JP) ................................ 2010-231767

(51) Int. Cl.
*G01D 13/22* (2006.01)

(52) U.S. Cl.
CPC ............... *G01D 13/22* (2013.01); *Y10S 116/06* (2013.01)

(58) Field of Classification Search
CPC ....... G01D 11/24; G01D 13/00; G01D 13/06; G01D 13/22; B60K 35/00
USPC ......... 116/278, 281–290, 294, 305, 328, 330, 116/331, 332, DIG. 6, DIG. 36, 297
See application file for complete search history.

(56) References Cited

U.S. PATENT DOCUMENTS

2001/0040717 A1 11/2001 Minoura et al.
2004/0085611 A1 5/2004 Minoura et al.

(Continued)

FOREIGN PATENT DOCUMENTS

CN 1591727 A 3/2005
CN 1930453 A 3/2007

(Continued)

OTHER PUBLICATIONS

International Search Report (PCT/ISA/210), issued by the International Searching Authority in corresponding International Application No. PCT/JP2011/060995 on Aug. 2, 2011.

(Continued)

*Primary Examiner* — R. A. Smith
(74) *Attorney, Agent, or Firm* — Sughrue Mion, PLLC

(57) ABSTRACT

A center-less pointer type display apparatus includes a pointer moving device having a pointer section and a carrying section, and a containing case having a case body and a dial plate. A pointer accommodated in the containing case indicates a scale on the dial plate. The carrying section has a guide rail and a wire. A spring is interposed between a first support member and a second support member of the pointer section so that a lower portion and an upper portion of the spring push the first support member and the second support member respectively, and thereby holding an upper portion and a lower portion of the guide rail respectively. A wire fixing section is provided at an intermediate portion of the pointer section on a line connecting the upper pulley and the lower pulley.

3 Claims, 12 Drawing Sheets

(56) References Cited

U.S. PATENT DOCUMENTS

| | | | |
|---|---|---|---|
| 2006/0290486 | A1 | 12/2006 | Sumiya et al. |
| 2011/0179991 | A1 | 7/2011 | Katsumata et al. |

FOREIGN PATENT DOCUMENTS

| | | | | | |
|---|---|---|---|---|---|
| FR | 2594540 | A | * | 9/1987 | ............ G01D 13/22 |
| JP | 48-4854 | | | 2/1973 | |
| JP | 53-128547 | | | 10/1978 | |
| JP | 55-60862 | A | | 5/1980 | |
| JP | 7-33939 | U | | 6/1995 | |
| JP | 2005-43293 | A | | 2/2005 | |
| JP | 2005-78852 | A | | 3/2005 | |
| JP | 2005-106588 | A | | 4/2005 | |
| JP | 2008-128948 | A | | 6/2008 | |
| JP | 2009002716 | A | | 1/2009 | |
| JP | 2009-42034 | A | | 2/2009 | |
| MY | 140656 | A | | 1/2010 | |
| WO | WO 9740347 | A1 | * | 10/1997 | ............ G01D 13/22 |
| WO | 2010/038878 | A1 | | 4/2010 | |

OTHER PUBLICATIONS

Written Opinion (PCT/ISA/237) of the International Searching Authority, issued in corresponding International Application No. PCT/JP2011/060995 on Aug. 2, 2011.

Office Action dated Jul. 23, 2014 issued by the State Intellectual Property Office of P.R. China in corresponding Chinese Application No. 201180023592.3.

Office Action dated Dec. 3, 2013, issued by the Japan Patent Office in corresponding Japanese Application No. 2010-231767.

Search Report dated Aug. 25, 2014 issued by the European Patent Office in counterpart European Patent Application No. 11780692.7.

* cited by examiner (A)

(B)

CENTER-LESS POINTER TYPE DISPLAY APPARATUS

TECHNICAL FIELD

The present invention relates to a pointer type display apparatus to be mounted on a vehicle such as, for example, an automobile and, more particularly, to a center-less pointer type display apparatus.

BACKGROUND ART

Devices described in, for example, Patent Documents 1 and 2 are known as a center-less pointer type display apparatus in which a rotation center of a pointer is made to be an opening portion and only the pointer is moved on a circular arc line.

PRIOR ART DOCUMENTS

Patent Documents

Patent Document 1: JP-A-2005-43293
Patent Document 2: JP-A-2009-42034

<Pointer Type Instrument Described in Patent Document 1>

A pointer type instrument described in Patent Document 1, is a center-less pointer type display apparatus which is configured to allow a friction resistance between a pointer section and a carrying section to be reduced. The pointer type instrument is provided with the pointer section which is disposed on a front side of the display device so as to allow a display face to be visually observed, a pointer provided on the pointer section, a drive mechanism that moves the pointer section so as to allow the pointer to indicate an index section and a guide which supports the pointer section so as to make it movable. In the pointer type instrument, a lubricant member is provided at a contact portion between the pointer section and the guide.

<<Problem>>

The center-less pointer type display apparatus described in Patent Document 1, is provided with the lubricant member so as to reduce the friction resistance. However, a flexible member having arranged teeth is used so that there is a limitation in reduction of the friction resistance.

<Instrument Described in Patent Document 2>

An instrument described in Patent Document 2 is a center-less pointer type display apparatus without the use of a flexible member having arranged teeth. In the center-less pointer type display apparatus, a moving mechanism for moving a pointer is constituted to have a flexible member coupled to a pointer attachment body, a first pulley to which one end side of the flexible member is wound, a second pulley to which the other end side of the flexible member is wound, a spiral spring which urges the first pulley so as to rotate the first pulley in a direction allowing the first pulley to wind the flexible member, a motor which rotates the second pulley in accordance with a measurement amount so as to move the flexible member along its longitudinal direction, and a plurality of guide pulleys which regulate a movement locus of the flexible member. With this, the center-less pointer type display apparatus in which a friction resistance between a pointer section and a carrying section is reduced, can be achieved.

<<Problem>>

However, since the pointer is directly attached to the attachment body of the moving mechanism, it is not proper to stably carry the pointer.

SUMMARY OF INVENTION

Problems that the Invention is to Solve

The invention is made in order to solve the above problems, and the primary purpose of the invention is to provide a center-less pointer type display apparatus that can allow a friction resistance between a pointer section and a carrying section to be reduced and can stably carry a pointer.

Means for solving the Problems

To solve the above problems, the invention provides the following aspects. A center-less pointer type display apparatus of a first aspect of the invention is characterized in that it includes a pointer moving device that is provided with a pointer section which supports a pointer and a carrying section which carries the pointer section and is formed in a substantially semicircular arc or substantially ellipse shape, and a containing case that is formed of a case body which is blocked by a semicircular shaped dial plate having an opening portion near its center, the containing case accommodating the pointer moving device so as to allow the pointer to indicate a scale on the dial plate. In the center-less pointer type display apparatus, the carrying section is provided with a guide rail having a transverse U-shaped cross section and a wire which is moved along the guide rail. The pointer section is provided with a first support member which supports an upper pulley and a second support member which supports a lower pulley. In the pointer section, a spring is interposed between the first support member and the second support member in such a manner that a lower portion of the spring pushes the first support member, an upper portion of the spring pushes the second support member, and thereby the upper pulley on the first support member and the lower pulley on the second support member hold the guide rail at an upper portion and a lower portion thereof, respectively. A wire fixing section which fixes the wire is provided at an intermediate portion of the pointer section on a line connecting the upper pulley and the lower pulley, and thereby the wire is fixed to the wire fixing section.

The center-less pointer type display apparatus of a second aspect of the invention according to the first aspect is characterized in that two pulleys are provided on the upper portion of the pointer section, and the lower pulley is disposed on a perpendicular bisector connecting the two pulleys on the upper portion.

A center-less pointer type display apparatus of a third aspect of the invention characterized in that it includes a pointer moving device that is provided with a pointer section which supports a pointer and a carrying section which carries the pointer section and is formed in a substantially semicircular arc or substantially ellipse shape, and a containing case that is formed of a case body which is blocked by a semicircular shaped dial plate having an opening portion near its center, the containing case accommodating the pointer moving device so as to allow the pointer to indicate a scale on the dial plate. In the center-less pointer type display apparatus, the carrying section is provided with a guide rail and a wire which is moved along the guide rail. The pointer section is provided with a first support member which supports an upper pulley and a second support member which supports a lower pulley. In the pointer section, a spring is interposed between the first support member and the second support member in such a manner that a lower portion of the spring pushes the first support member, an upper portion of the spring pushes the second support member, and thereby the upper pulley on the first support member and the lower pulley on the second support member hold the guide rail at an upper portion and a lower portion thereof, respectively. A pawl for stopper is formed on the second support member and a hole portion for restriction is formed on the first support member, the pawl for stopper being inserted into the hole portion for restriction in a state in which the first support member and the second support member are combined with each other.

The center-less pointer type display apparatus of a fourth aspect of the invention is characterized in that it is configured by combining the first aspect and the third aspect of the invention, or the second aspect and the third aspect of the invention. The center-less pointer type display apparatus includes a pointer moving device that is provided with a pointer section which supports a pointer and a carrying section which carries the pointer section and is formed in a substantially semicircular arc or substantially ellipse shape, and a containing case that is formed of a case body which is blocked by a semicircular shaped dial plate having an opening portion near its center, the containing case accommodating the pointer moving device so as to allow the pointer to indicate a scale on the dial plate. In the center-less pointer type display apparatus, the carrying section is provided with a guide rail having a transverse U-shaped cross section and a wire which is moved along the guide rail. The pointer section is provided with a first support member which supports an upper pulley and a second support member which supports a lower pulley. In the pointer section, a spring is interposed between the first support member and the second support member in such a manner that a lower portion of the spring pushes the first support member, an upper portion of the spring pushes the second support member, and thereby the upper pulley on the first support member and the lower pulley on the second support member hold the guide rail at an upper portion and a lower portion thereof, respectively. A wire fixing section which fixes the wire is provided at an intermediate portion of the pointer section on a line connecting the upper pulley and the lower pulley, and thereby the wire is fixed to the wire fixing section. A pawl for stopper is formed on the second support member and a hole portion for restriction is formed on the first support member, the pawl for stopper being inserted into the hole portion for restriction in a state in which the first support member and the second support member are combined with each other.

Advantageous of the Invention

In accordance with the first aspect of the invention, since a direction of a force that the wire fixed to the wire fixing section acts on the pointer section, is on the same line as that of a force acting between the guide rail and the pulley, a rotational force is not generated on the pointer of the pointer section so that the pointer is not inclined. Therefore a deviation in indication of the pointer is eliminated, and increase of a sliding friction between the pulley and the guide rail is prevented.

In addition, in accordance with the second aspect of the invention, since the guide rail is held by three pulleys, the pointer can be stably carried.

Further, in accordance with the third and fourth aspects of the invention, even when an outer force larger than a force of pressing the guide rail by a tensile force of the spring acts in the opposite direction of the tensile force of the spring in the event when the first support member is attached to the support member, it is possible to prevent a pointer attachment section from coming off from the guide rail.

BRIEF DESCRIPTION OF THE DRAWINGS

FIG. 12(A) is the view showing it after assembling, and FIG. 12(B) is the view showing it before assembling.

MODE FOR CARRYING OUT THE INVENTION

A center-less pointer type display apparatus that can allow a friction resistance between a pointer section and a carrying section to be reduced and can stably carry a pointer, is described below with reference to accompanying drawings.

<Related Art Invention>

First, a related art invention on which the invention is based, is described with reference to FIGS. 5 to 9.

Figure 5:
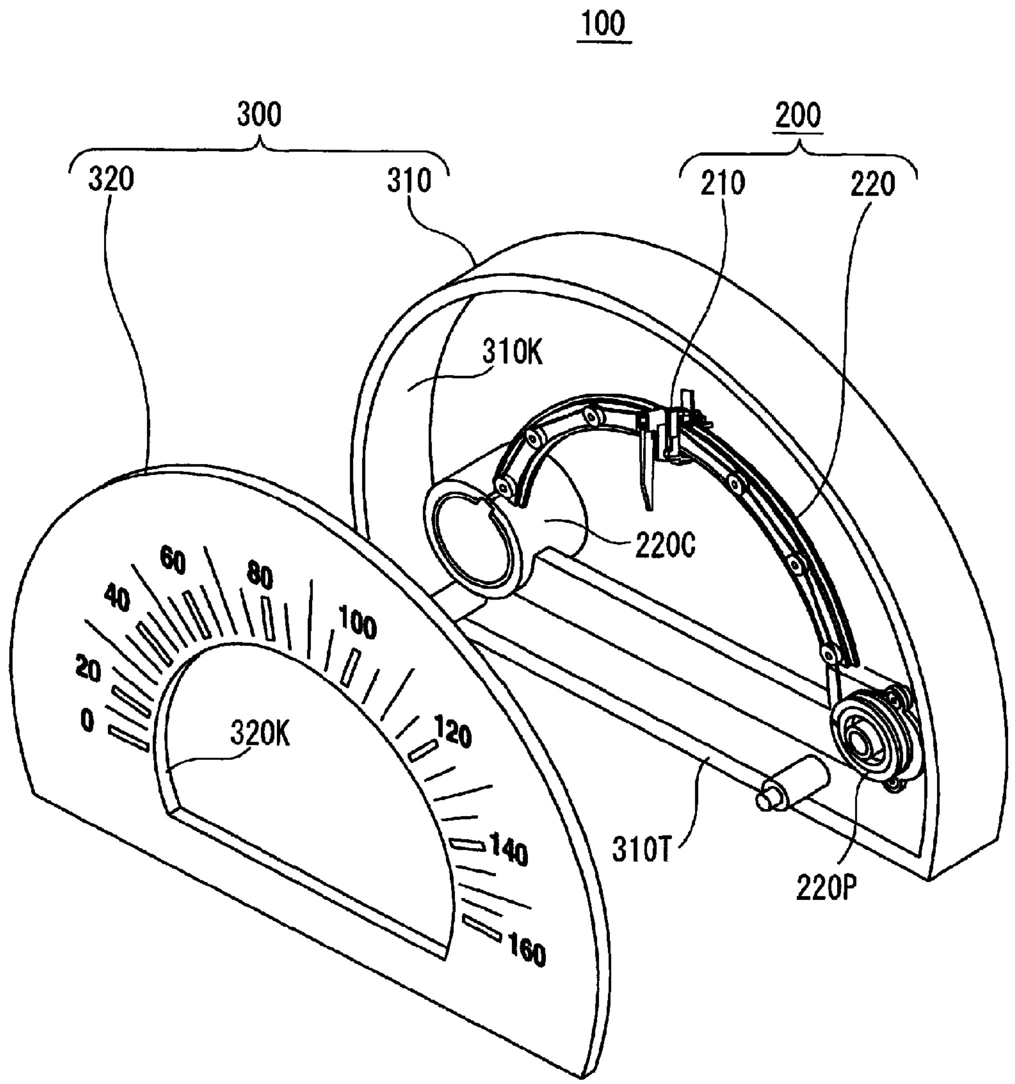
FIG. 5 is an exploded perspective view showing the center-less pointer type display apparatus including a pointer moving device according to a related art invention.
Figure 6:
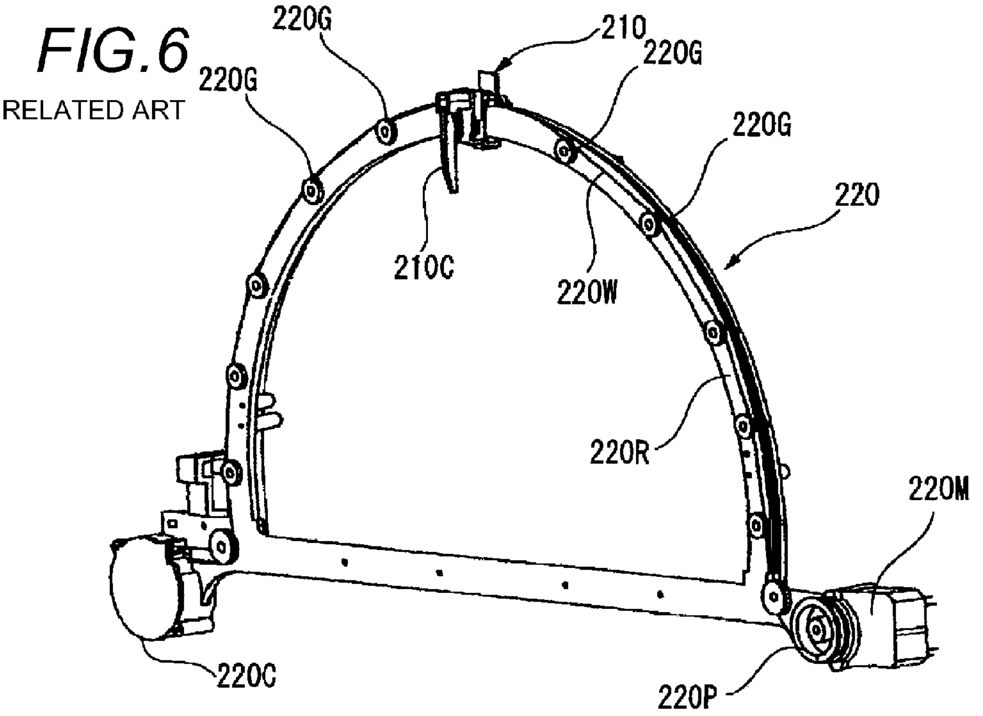
FIG. 6 is a perspective view showing a carrying section which carries the pointer moving device according to the related art invention.
Figure 7:
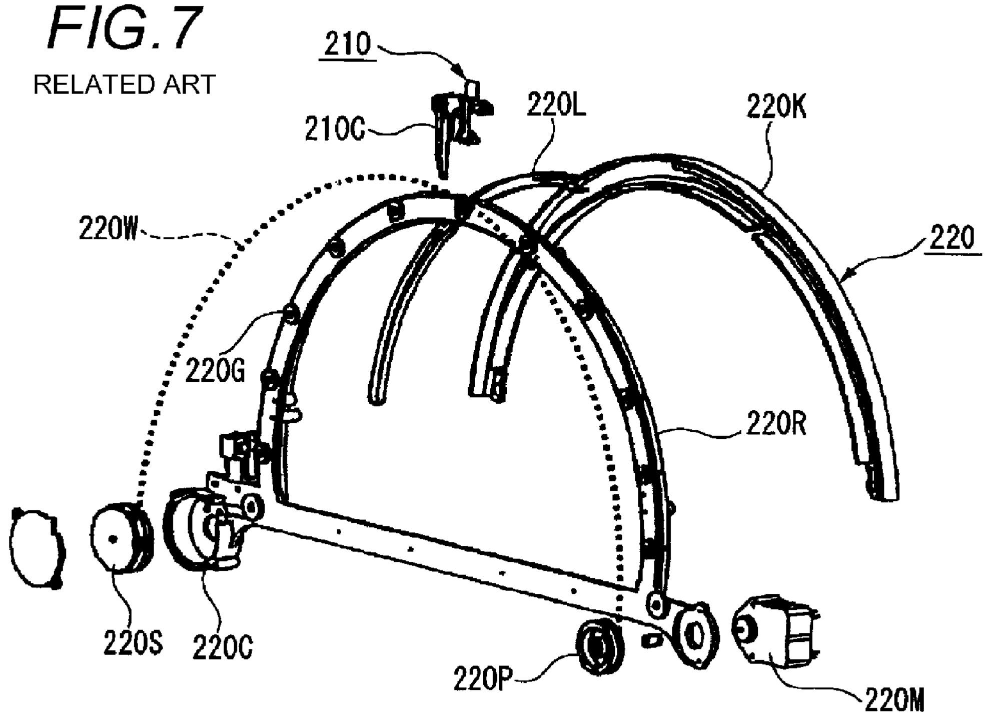
FIG. 7 is an exploded perspective view showing the carrying section shown in FIG. 6.
Figure 8:
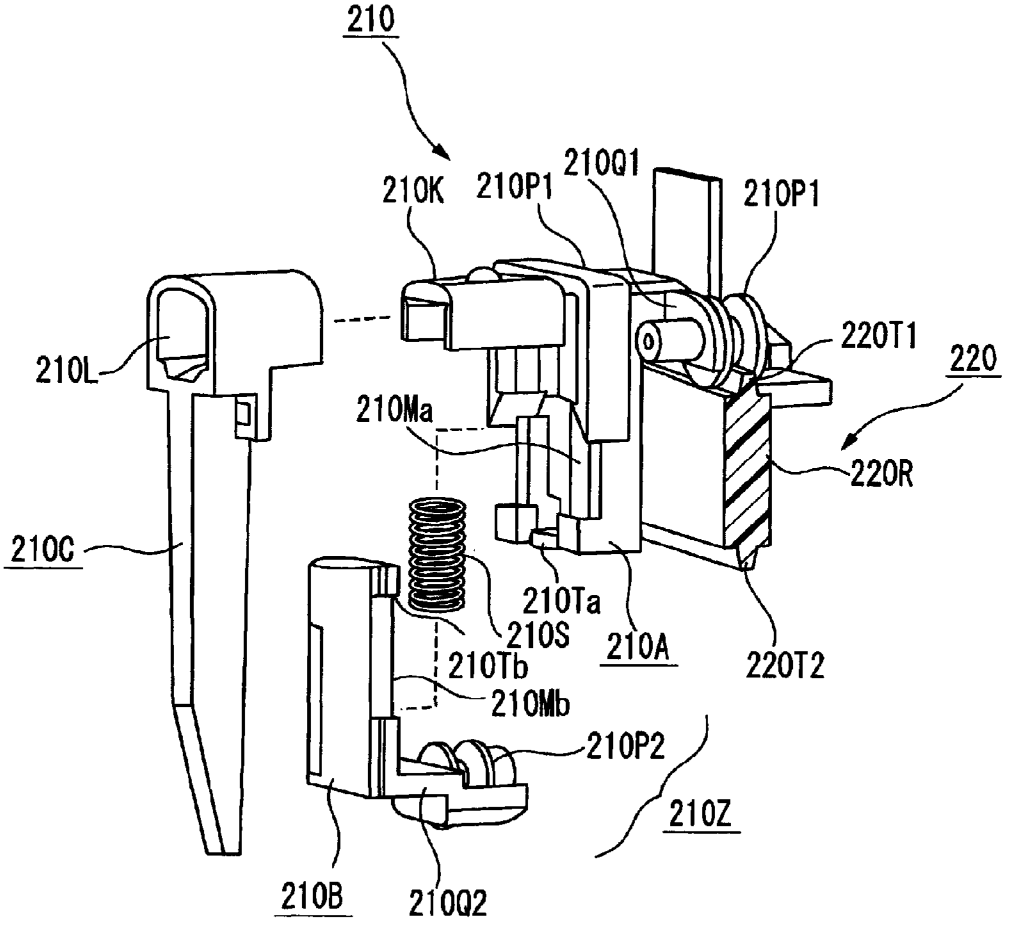
FIG. 8 is an exploded perspective view showing the pointer moving device according to the related art invention.
Figure 9:
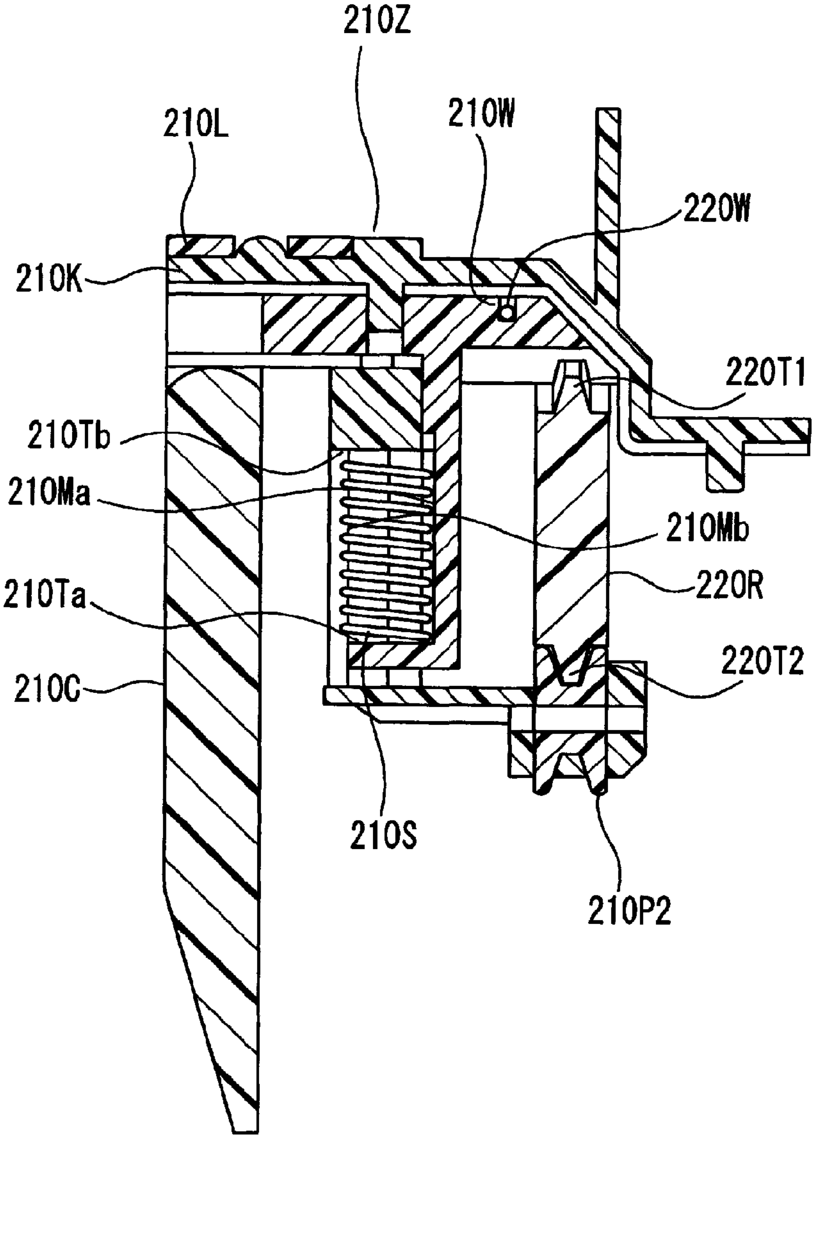
FIG. 9 is a vertical cross-sectional view showing the pointer moving device shown in FIG. 8.

The purpose of the related art invention is also to provide a center-less pointer type display apparatus that can allow a friction resistance between a pointer section and a carrying section to be reduced and can stably carry a pointer. FIG. 5 is an exploded perspective view showing the center-less pointer type display apparatus including a pointer moving device according to the related art invention, FIG. 6 is a perspective view showing a carrying section which carries the pointer moving device, FIG. 7 is an exploded perspective view showing the carrying section, FIG. 8 is an exploded perspective view showing the pointer moving device according to the related art invention, and FIG. 9 is a vertical cross-sectional view showing the pointer moving device shown in FIG. 8.

In FIG. 5, the center-less pointer type display apparatus 100 is mainly constituted by the pointer moving device 200 and a case 300 that accommodates and fixes the pointer moving device 200 in its inner space. The pointer moving device 200 is constituted to have a pointer section 210 and a carrying section 220 that carries the pointer section 210. The case 300 is constituted to have a case body 310 and a dial plate 320 which blocks the case body 310.

The case body 310, the dial plate 320, the pointer section 210 and the carrying section 220 are described below.

<Case Body 310>

The case body 310 is formed of a semicircular shaped plastic case having a semicircular opening portion 310K (in FIG. 5) at a driver side. A containing case 220C (in FIG. 6) that accommodates a tension component 220S (in FIG. 7) adapted to accommodate the pointer moving device 200 is fixed to one end (in the vicinity of the left end) of a bottom section 310T in the inner space of the case body 310 and a rewinding pulley 220P which is rotated in a forward or backward direction by a motor 220M (in FIGS. 6 and 7) is fixed to the other end (in the vicinity of the right end) of the bottom section 310T therein.

<Dial plate 320>

The dial plate 320 is formed of a semicircular plastic thin plate. A semicircular opening 320K having a predetermined radius about a center of the semicircle is formed on the dial plate 320, and scale bars are described on an outer periphery of the opening 320K in a circular arc shape. FIG. 5 shows an example of a scale of a speed meter, and numeric characters of 0, 20, 40 . . . , 140, and 160 (km/hour) are marked along a substantially semicircular or substantially ellipse shape at a predetermined distance. The dial plate 320 is attached to the case body 310 so as to block the semicircular opening portion 310K of the case body 310. A liquid crystal display device or the like is disposed in the inner space at the opening 320K. A guide rail 220R (in FIG. 7) is disposed at the rear side of the dial plate 320.

<Pointer Section 210>

Attaching of Pointer 210C to First Support Member 210A

As it is understood from FIG. 8 of an exploded perspective view and FIG. 9 of a vertical cross-sectional view, the pointer section 210 that is moved on the carrying section 220 (in FIG. 6), is constituted to have a support member 210Z which is formed such that a first support member 210A and a second support member 210B sandwich a coil spring 210S and are integrally fitted to each other, and the pointer 210C to be fitted to the first support member 210A. That is, a cantilever arm shaped pointer fixing section 210K is formed on an upper end face of the first support member 210A. On the other hand, the pointer 210C has a vertically elongated shape and is formed in a cone shape such that the thickness is gradually increased from its lower end to its upper end in the longitudinal direction of the pointer 210C. An opening portion 210L for fixing is formed on an upper end wide width portion of the pointer 210C. By fitting the pointer fixing section 210K to the opening portion 210L for fixing, the pointer 210C is attached to the first support member 210A and, therefore, also to the support member 210Z.

<<Fixing of Pointer Section 210 to Wire 220W>>

In addition to the above, a wire fixing groove 210W (in FIG. 9) is formed on an upper central portion of the first support member 210A, and the wire 220W (in FIG. 9) is broken in the wire fixing groove 210W to be fixed thereto. Therefore, when the wire 220W is pulled out or rewound by the carrying section 220, the first support member 210A and, therefore, also the pointer section 210 are moved along an extending direction of the scale of the dial plate 320 (in FIG. 5).

<<Attaching of Pointer Section 210 to Guide Rail 220R>>

As it is understood from FIGS. 8 and 9, upper pulleys 210P1 and 210P1 are provided on an upper portion of the first support member 210A via respective pulley shaft support sections 210Q1 disposed on the front and rear sides of an axis direction of the pointer fixing section 210K. A lower pulley 210P2 is provided on a lower end of the second support member 210B via a pulley shaft support section 210Q2 in the axis direction of the pointer fixing section 210K.

In addition, a storage groove 210Ma which partially accommodates a side face of the coil spring 210S and an abutment portion 210Ta which presses a lower portion of the coil spring 210S, are formed on the first support member 210A. A storage groove 210Mb which partially accommodates a side face of the coil spring 210S at the opposite side of the above side face and an abutment portion 210Tb which presses an upper portion of the coil spring 210S, are formed on the second support member 210B.

Therefore, since the coil spring 210S is accommodated between the storage groove 210Ma of the first support member 210A and the storage groove 210Mb of the second support member 210B, and the lower and upper portions of the coil spring 210S are accommodated between the abutment portion 210Ta of the first support member 210A and the abutment portion 210Tb of the second support member 210B, a repulsive force is generated on the coil spring 210S, and thereby the repulsive force acts in such a manner that it pushes downward the first support member 210A and pushes upward the second support member 210B so that the upper pulleys 210P1 and the lower pulley 210P2 are always urged in the directions whereby they are brought into close proximity to each other.

Consequently, by making upper and lower projected portions 220T1 and 220T2 of a guide rail 220R to be sandwiched between recessed portions of the two upper pulleys 210P1 and a recessed portion of one lower pulley 210P2, the support member 21Z, i.e., the pointer section 210 can be surely held on the guide rail 220R, and thereby the pointer section 210 can be carried on the carrying section 220.

<Carrying Section 220>

As shown in FIG. 6, the carrying section 220 shown in FIG. 5, is provided with the guide rail 220R, a plurality of guide pulleys 220G which are arranged on one long side face of the guide rail 220R at a predetermined distance, the wire 220W suspended over the guide pulleys 220G, a tension component 220S which is provided at one end (at the left side in FIG. 7) of the substantially semicircular arc or substantially ellipse shaped guide rail 220R in the lengthwise direction so as to always apply a tension in a direction opposite to a circular arc direction, the rewinding pulley 220P provided at the other end (at the right side in FIG. 7) of the guide rail 220R, the motor 220M which rotates the rewinding pulley 220P in a forward or backward direction, a substantially semicircular arc or substantially ellipse shaped conductive component 220L which is adapted to supply power to an LED for illumination disposed on the pointer section 210, and a conductive component cover 220K which is adapted to cover the conductive component 220L.

<<Shape of Guide Rail 220R>>

The guide rail 220R is formed in a substantially semicircular arc or substantially ellipse shape in the lengthwise direction, and its cross-section is in a thin, long rectangular shape (in FIG. 9). Central portions of upper and lower short sides thereof have the respective projected portions 220T1 and 220T2.

<<Moving Principle of Wire 220W>>

The one end (at the left side in FIG. 7) of the wire 220W is fastened to the tension component 220S so as to cause the wire 220W to be always urged in the direction opposite to the circular arc direction. The other end (at the right side in FIG. 7) of the wire 220W is fastened to the rewinding pulley 220P. The wire 220W is constituted in such a manner that it can be pulled out from the tension component 220S side by a desired length by the forward rotation of the motor 220M and can be rewound to the tension component 220S side by a desired length by the tension component 220S by the backward rotation of the motor 220M.

<Attaching of Pointer Section 210 to Carrying Section 220>

In a case where the pointer section 210 is attached to the carrying section 220, as described in FIG. 9, the projected portions 220T at the upper and lower ends of the guide rail 220R of the carrying section 220 are sandwiched between the recessed portions of the two upper pulleys 210P1 and the one lower pulley 210P2 of the pointer section 210, and thereby the support member 210Z can be surely attached to the guide rail 220R.

Since the wire 220W is broken in and fixed to the wire fixing groove 210W (in FIG. 9) formed on the first support member 210A, the pointer section 210 is moved along the extending direction of the scale (in FIG. 5) of the dial plate 320 every time when the wire 220W is pulled out from or returned to the tension component 220S (in FIG. 7) side by a desired length by the forward or backward rotation of the motor 220M (in FIG. 7).

<Problem 1 of Related art Invention>

In accordance with the above related art invention, the pointer section 210 attached to the guide rail 220R of the carrying section 220 is surely carried on the carrying section 220. However, based on inspection of the display device of the related art invention, it was revealed that (1) a deviation in indication of the pointer 210C was generated, and (2) a sliding friction between the upper pulleys 210P1 and the guide rail 220R or the lower pulley 210P2 and the guide rail 220R was increased.

<Secondary Purpose of the Invention>

In addition to the primary purpose of the invention that the problems of the conventional display device of the related art invention is to be solved (the friction resistance between the pointer section and the carrying section is reduced, and the pointer is stably carried), the secondary purpose of the invention is to solve the problems of the related art invention, that is, (1) a deviation in indication of the pointer 210C is to be eliminated, and (2) increase of the sliding friction between the upper pulleys 210P1 and the guide rail 220R or the lower pulley 210P2 and the guide rail 220R is to be prevented.

The invention capable of achieving the primary and secondary purposes is described below with reference to accompanying drawings.

<Causes of Occurrence of Problems>

Figure 10:
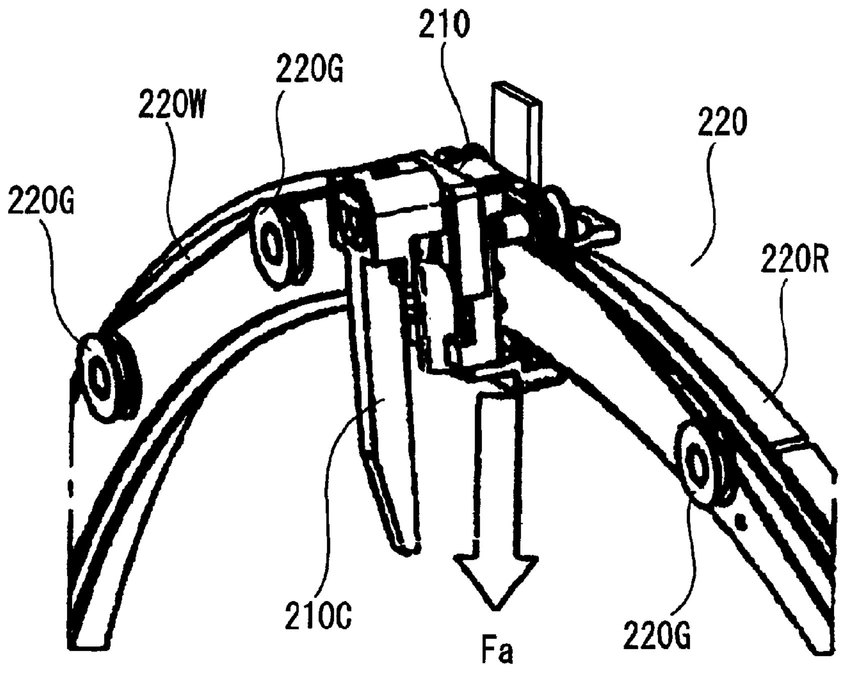
FIG. 10 is an enlarged perspective view showing the pointer moving device shown in FIG. 6.

Causes of occurrence of the problems of the related art invention are described below with reference to FIGS. 10 and 11.

Figure 11:
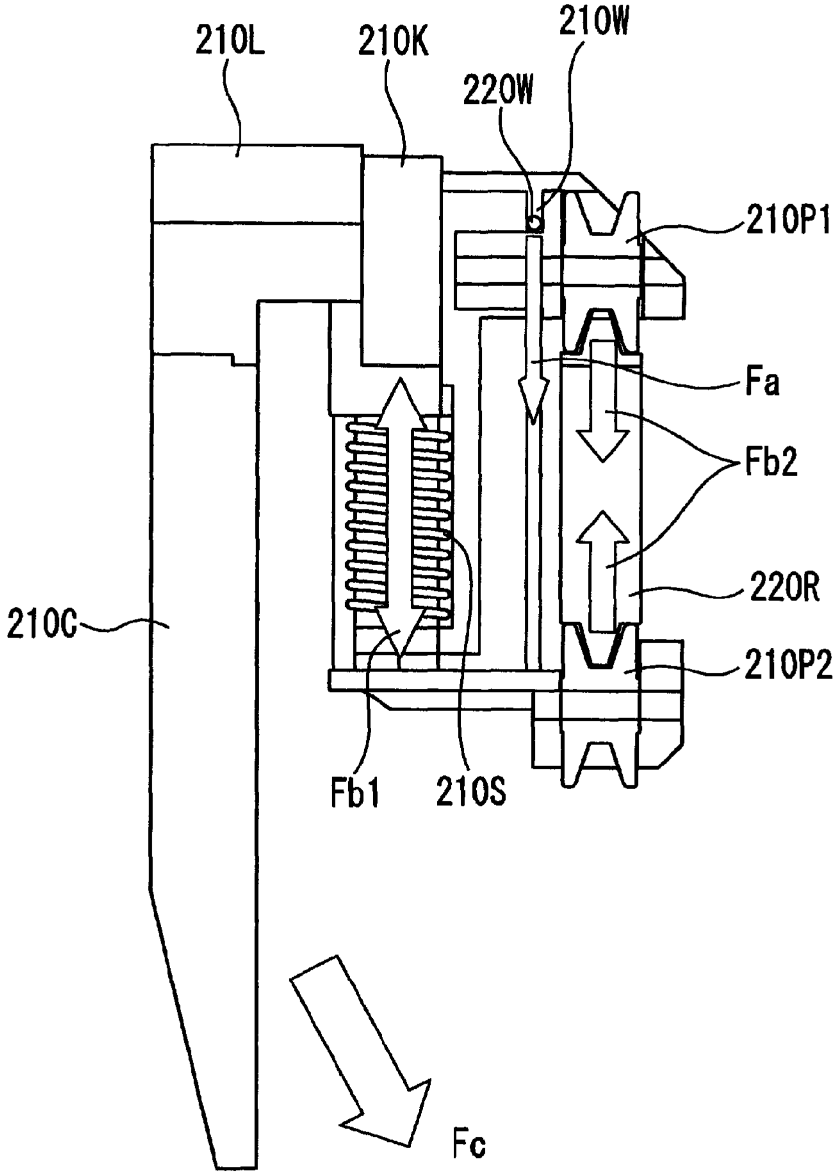
FIG. 11 is a vertical cross-sectional view showing the pointer moving device in order to explain problems of the pointer moving device according to the related art invention.

By winding the wire 220W by the tension component 220S (in FIG. 7) and the motor 220M, a force in the just downward direction Fa (in FIG. 10) is generated on the wire fixing groove 210W in the pointer section 210 (in FIGS. 9 and 11).

However, a portion where the pointer section 210 is supported by the guide rail 220R, is one as shown in FIG. 11, where the pointer section 210 is held on the guide rail 220R by a tensile force Fb1 of the coil spring 210S via the upper pulleys 210P1 and the lower pulley 210P2.

Therefore, a position of the wire 220W where the force in the direction Fa is applied to the pointer section 210 is not on the same line as that of the forces Fb2 acting on the guide rail 220R, the upper pulleys 210P1 and the lower pulley 210P2. As a result, a rotational force centering around a holding portion by the upper pulleys 210P1 and the lower pulley 210P2 of the guide rail 220R, is generated on the pointer 210C of the pointer section 210 so that the pointer 210C is inclined in a direction Fc. Consequently, it is revealed that the rotational force causes the deviation in indication of the pointer 210C and increase of the sliding friction between the upper pulleys 210P1 and the guide rail 220R or the lower pulley 210P2 and the guide rail 220R.

<Solution by the Invention>

Therefore, it is understood that in order not to generate the rotational force on the pointer 210C of the pointer section 210, the position of the wire 220W where the force in the direction Fa is applied to the pointer section 210 is made to be on the same line as that of the forces Fb2 acting on the guide rail 220R, the upper pulleys 210P1 and the lower pulley 210P2. Consequently, as described below, the display device of the invention is formed to have a structure in which the attachment position of the wire 220W where the force in the direction Fa is applied to the pointer section 210 is to be on the same line as that of the forces Fb2 acting on the guide rail 220R, the upper pulleys 210P1 and the lower pulley 210P2. As a result, a rotational force is not generated on the pointer 210C of the pointer section 210 so that the pointer 210C is not inclined in the direction Fc, a deviation in indication of the pointer 210C does not occur, and the sliding friction between the upper pulleys 210P1 and the guide rail 220R or the lower pulley 210P2 and the guide rail 220R, is not increased.

<Center-Less Pointer Type Display Apparatus 10 According to the Invention>

A center-less pointer type display apparatus 10 according to the invention, is described below. The center-less pointer type display apparatus 10 according to the invention includes a containing case 30 and a pointer moving device 20 accommodated in the containing case 30. In particular, a case body 31, a dial plate 32, a pointer section 21 and a carrying section 22 are described below in detail.

<Case Body 31>

The case body 31 is formed of a semicircular shaped plastic case having a semicircular opening portion 31K (in FIG. 1) at a driver side. The case body 31 is provided with a tension component containing case 22C that accommodates a tension component 22S (not shown because it is the same as the tension component 220S in FIG. 7) adapted to accommodate the pointer moving device 20 disposed at one end (in the vicinity of the left end in FIG. 1) of a bottom section 31T in an inner space thereof, and a rewinding pulley 22P which is rotated in a forward or backward direction by a motor 22M (not shown because it is the same as the motor 220M in FIG. 7) disposed at the other end (in the vicinity of the right end in FIG. 1) of the bottom section 31T therein.

<Dial Plate 32>

Figure 1:
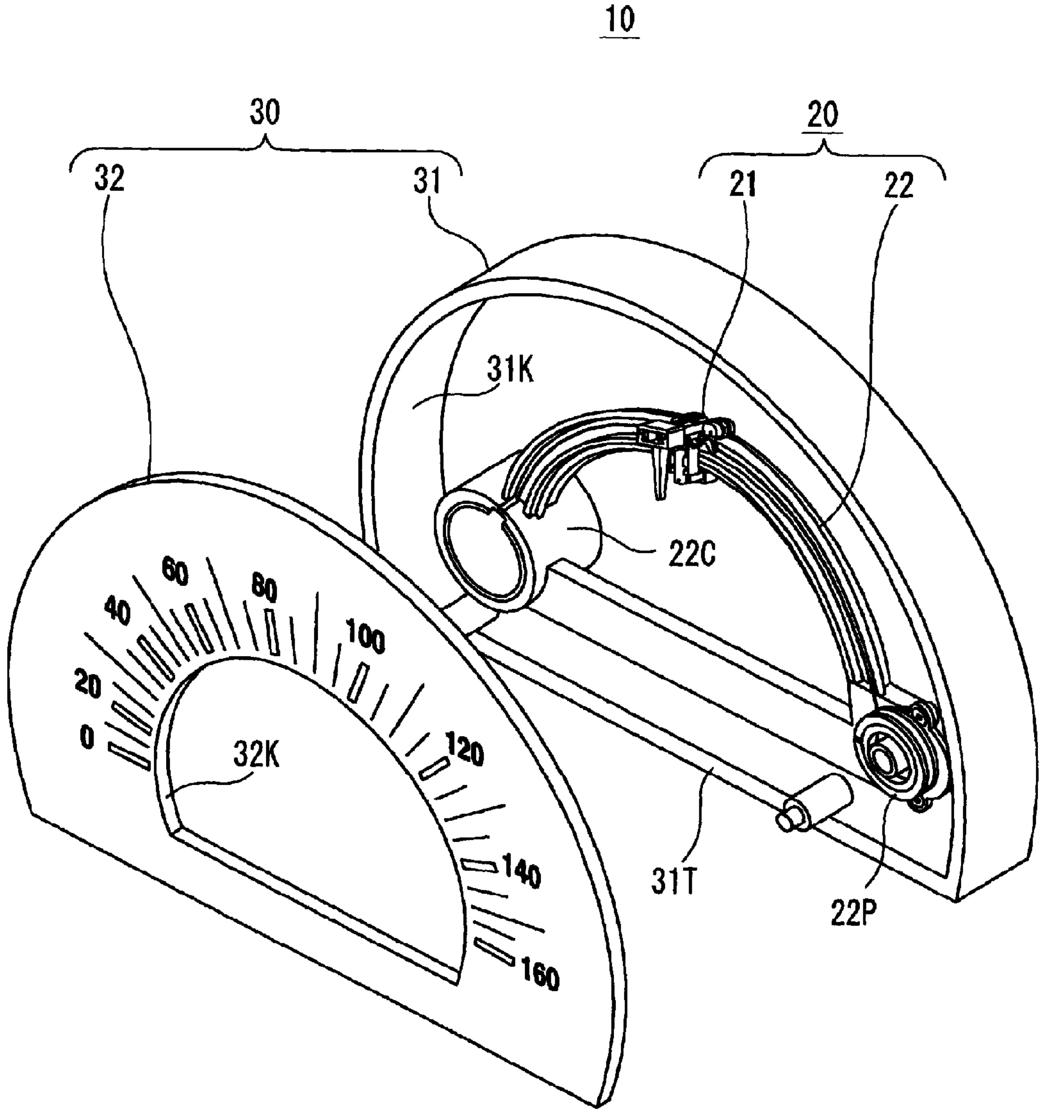
FIG. 1 is an exploded perspective view showing a center-less pointer type display apparatus including a pointer moving device according to the invention.

The dial plate 32 is formed of a semicircular plastic thin plate. The semicircular shaped opening 32K having a predetermined radius about a center of the semicircle is formed on the dial plate 32, and scale values are described on an outer periphery of the opening 32K in a circular arc shape. FIG. 1 shows an example of a scale of a speed meter, and numeric characters of 0, 20, 40 . . . , 140, and 160 (km/hour) are marked along a substantially semicircular or substantially ellipse shape at a predetermined distance. The dial plate 32 is attached to the case body 31 so as to block the semicircular opening portion 31K of the case body 31. A liquid crystal display device or the like is disposed in the inner space at the opening 32K. A guide rail 22R is disposed at the rear side of the dial plate 32.

<Pointer Section 21>

Attaching of Pointer 21C to First Support Member 21A

Figure 2:
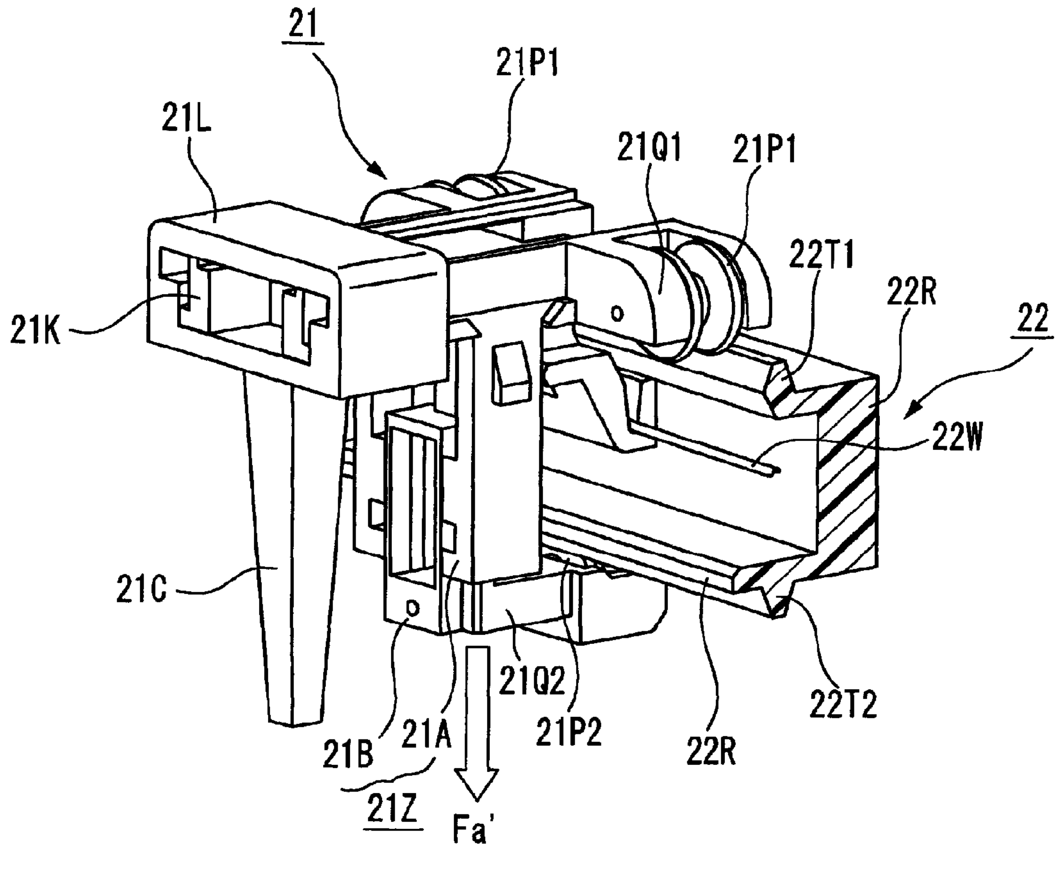
FIG. 2 is a perspective view showing the pointer moving device, i.e., a main part of the center-less pointer type display apparatus according to the invention.
Figure 3:
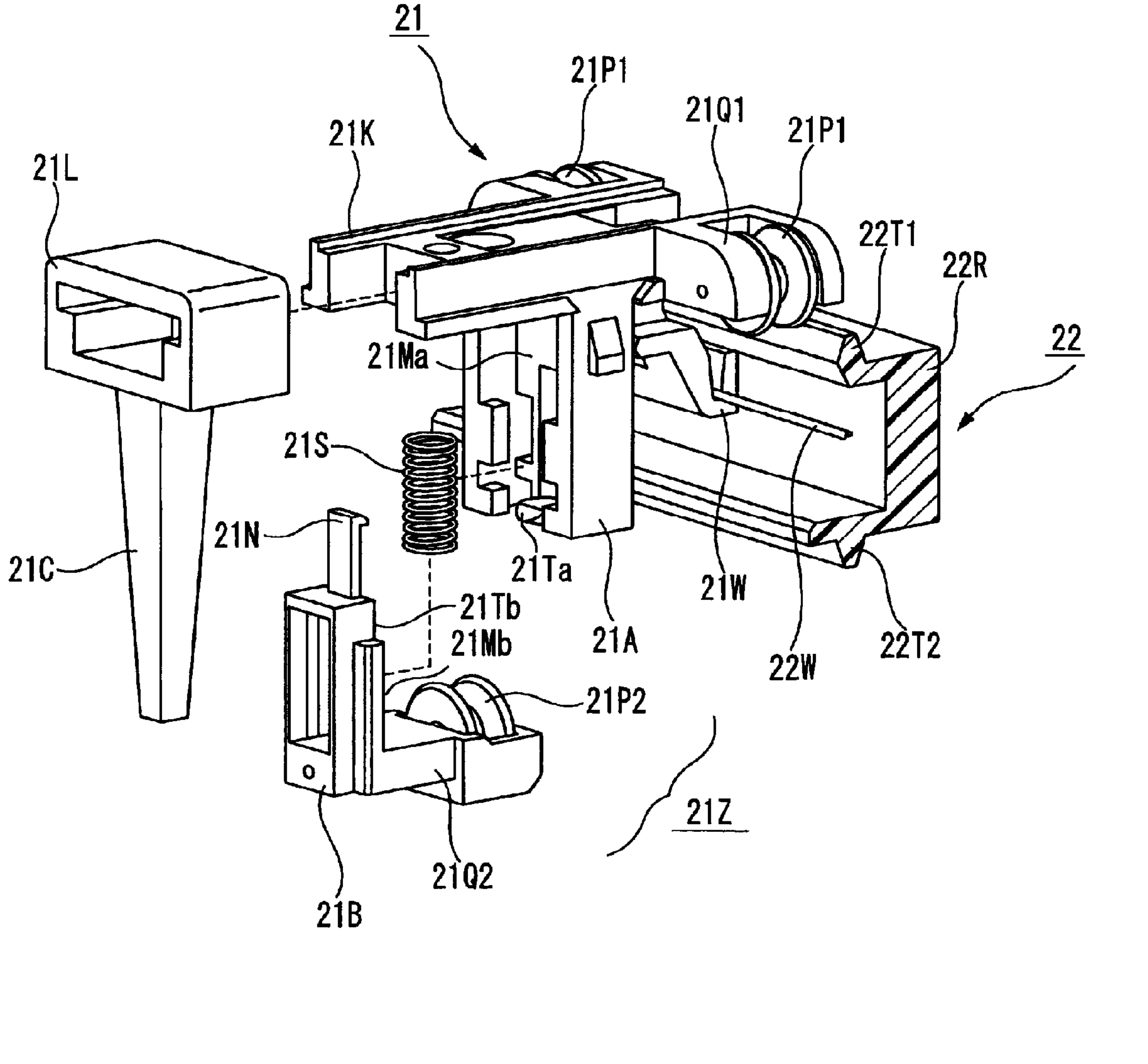
FIG. 3 is an exploded perspective view showing the pointer moving device shown in FIG. 2.
Figure 4:
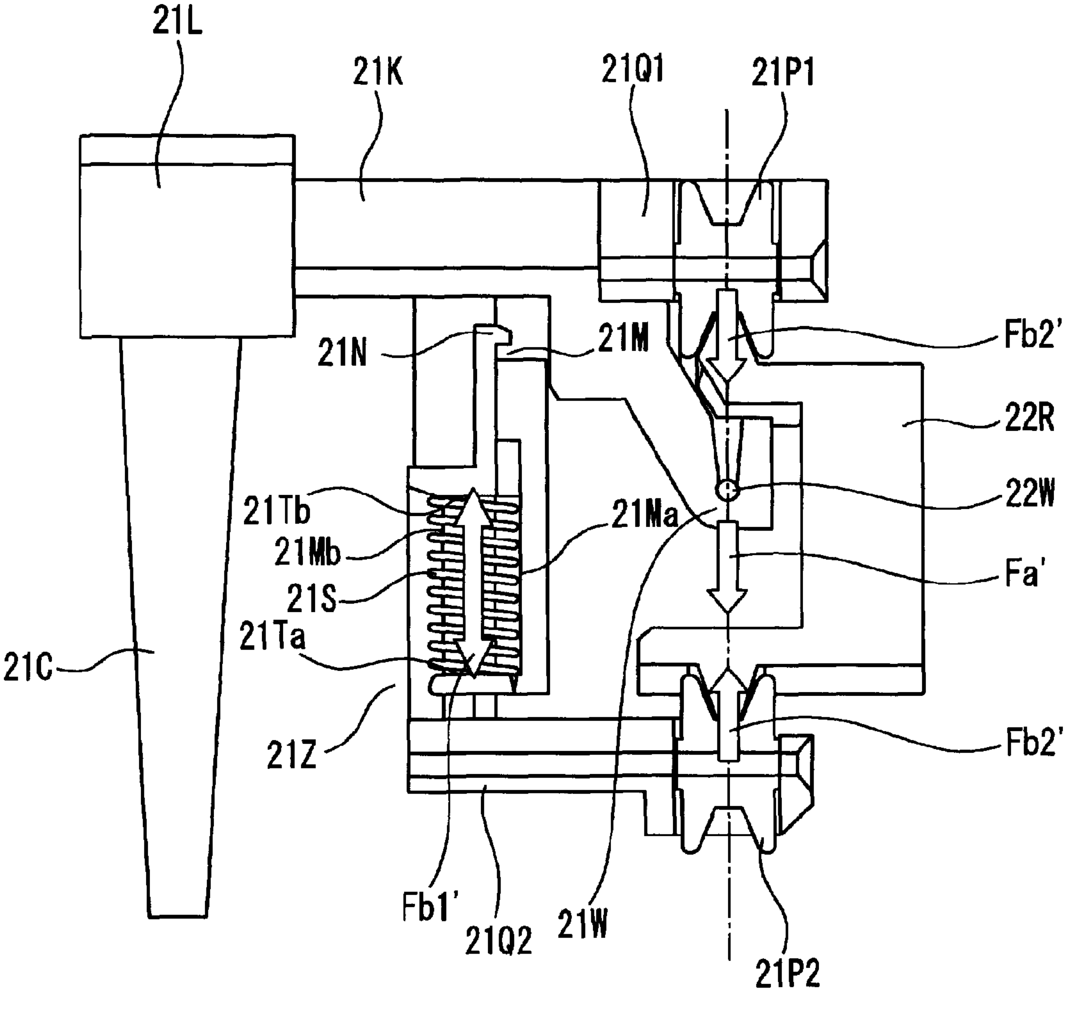
FIG. 4 is a vertical cross-sectional view showing the pointer moving device shown in FIG. 2.

Turning to FIG. 1, as it is understood from FIG. 2 of an exploded perspective view of the pointer moving device, FIG. 3 of an exploded view and FIG. 4 of a vertical cross-sectional view, the pointer section 21 which is moved on the carrying section 22, is constituted to have a support member 21Z (in FIG. 4) which is formed such that a first support member 21A and a second support member 21B sandwich a coil spring 21S and are integrally fitted to each other, and the pointer 21C fitted to the first support member 21A. That is, a cantilever arm shaped pointer fixing section 21K is formed on an upper end face of the first support member 21A. On the other hand, the pointer 21C has a vertically elongated shape and is formed in a cone shape such that the thickness is gradually increased from its lower end to its upper end in the longitudinal direction of the pointer 21C. An opening portion 21L for fixing is formed on an upper end wide width portion of the pointer 21C. By fitting the pointer fixing section 21K to the opening portion 21L for fixing, the pointer 21C is attached to the first support member 21A and, therefore, also to the support member 21Z.

<<Fixing of Pointer Section 21 to Wire 22W>>

In addition to the above, a wire fixing groove 21W (in FIG. 4) is formed on an upper central portion of the first support member 21A, and the wire 22W (in FIG. 4) is broken in the wire fixing groove 21W to be fixed thereto.

Therefore, when the wire 22W is pulled out or rewound by the carrying section 22, the first support member 21A and, therefore, also the pointer section 21 are moved along an extending direction of the scale of the dial plate 32 (in FIG. 1).

<<Attaching of Pointer Section 21 to Guide Rail 22R>>

As it is understood from FIGS. 2 to 4, upper pulleys 21P1 and 21P1 are provided on an upper portion of the first support member 21A via respective pulley shaft support sections 21Q1 disposed on the front and rear sides of an axis direction of the pointer fixing section 21K. A lower pulley 21P2 is provided on a lower end of the second support member 21B via a pulley shaft support section 21Q2 in the axis direction of the pointer fixing section 21K of the first support member 21A.

In addition, a storage groove 21Ma which partially accommodates a side face of the coil spring 21S and an abutment portion 21Ta which presses a lower portion of the coil spring 21S are formed on the first support member 21A. A storage groove 21Mb which partially accommodates a side face of the coil spring 21S at the opposite side of the above side face and an abutment portion 21Tb which presses an upper portion of the coil spring 21S, are formed on the second support member 21B.

Therefore, the coil spring 21S is accommodated between the storage groove 21Ma of the first support member 21A and the storage groove 21Mb of the second support member 21B, and the lower and upper portions of the coil spring 21S are accommodated between the abutment portion 21Ta of the first support member 21A and the abutment portion 21Tb of the second support member 21B. Thereby, a repulsive force is generated on the coil spring 21S, the repulsive force acts in such a manner that it pushes downward the first support member 21A and pushes upward the second support member 21B so that the upper pulleys 21P1 and the lower pulley 21P2 are always urged in the directions whereby they are brought into close proximity to each other.

Consequently, by making upper and lower projected portions 22T1 and 22T2 of a guide rail 22R to be sandwiched between recessed portions of the two upper pulleys 21P1 and a recessed portion of one lower pulley 21P2, the support member 21Z, i.e., the pointer section 21 can be surely held to the guide rail 22R, and thereby the pointer section 21 can be carried on the carrying section 22.

<Carrying Section 22>

The carrying section 22 is provided with the guide rail 22R (in FIG. 2), a plurality of guide pulleys 22G (not shown because it is the same as the guide pulleys 220G in FIG. 6) which are arranged on one long side face of the guide rail 22R at a predetermined distance, the wire 22W (in FIG. 2) suspended over the guide pulleys 22G, a tension component containing case 22C (in FIG. 1) which is provided at one end (at the left side in FIG. 1) of the substantially semicircular arc or substantially ellipse shaped guide rail 22R in the lengthwise direction and accommodates a tension component adapted to always apply a tension in a direction opposite to a circular arc direction, the rewinding pulley 22P provided at the other end (at the right side in FIG. 1) of the guide rail 22R, the motor 22M (not shown because it is the same as the motor 220M in FIG. 6) which rotates the rewinding pulley 22P in a forward or backward direction, a substantially y semicircular arc or substantially ellipse shaped conductive component 22L (not shown because it is the same as the conductive component 220L in FIG. 7) which is adapted to supply power to an LED for illumination disposed on the pointer section 21, and a conductive component cover 22K (not shown because it is the same as the conductive component cover 220K in FIG. 7) which is adapted to cover the conductive component 220L.

The guide rail 22R is formed in a substantially semicircular arc or substantially ellipse shape in the lengthwise direction, and its cross-section is in a transverse U-shape (in FIGS. 2 and 3). Leg sections of the guide rail 22R at the upper and lower portions are respectively provided with projected portions 22T1 and 22T2 at the respective outsides.

In addition, one end of the wire 22W is fastened to the tension component 22S (see 220S in FIG. 7) so as to cause the wire 220W to be always urged in the direction opposite to the circular arc direction, and the other end of the wire 22W is fastened to the rewinding pulley 22P. The wire 22W is constituted in such a manner that it can be pulled out from the tension component 22S side by a desired length by the forward rotation of the motor 22M and can be rewound to the tension component 22S side by a desired length by the backward rotation of the motor 22M by means of the tension component 22S.

<Attaching of Pointer Section 21 to Carrying Section 22>

In a case where the pointer section 21 is attached to the carrying section 22, as described in FIGS. 2 to 4, the recessed portions of the two upper pulleys 21P1 and the recessed portion of the one lower pulleys 21P2 in the pointer section 21 are respectively fitted to the upper projected portions 22T1 and the lower projected portion 22T2 of the guide rail 22R in the carrying section 22 so as to sandwich the guide rail 22R, and thereby the support member 21Z can be surely attached to the guide rail 22R.

Since the wire 22W is broken in and fixed to the wire fixing groove 21W (in FIGS. 3 and 4) formed on the first support member 21A, the pointer section 21 is moved along the extending direction of the scale (in FIG. 1) of the dial plate 32 every time when the wire 22W is pulled out from or returned to the tension component containing case 22C (in FIG. 1) side by a desired length by the forward or backward rotation of the rewinding pulley 22P (in FIG. 1) driven by the motor 22M (in FIG. 7).

<Solution by Invention for Problems of Related Art Invention>

Thus, in the invention, the pointer section 21 which is moved along the transverse U-shaped guide rail 22R is provided such that, as shown in FIG. 4, the guide rail 22R is sandwiched by two points at the upper face and one point of the lower face of the guide rail 22R, i.e., three points, via the pulleys 22P1, 22P1 and 22P2, and the wire fixing groove 21W of the wire 22W for pulling the pointer section 21 is positioned on a line connecting the upper face and the lower face of the transverse U-shaped guide rail 22R. Therefore, in FIG. 4, a force in a direction Fa' acting on the wire fixing groove 21W of the wire 22W by a repulsive force Fb1' due to the coil spring 21S is on the same line as that of a force Fb2' acting on the guide rail 22R, the upper pulleys 21P1 and the lower pulley 21P2 so that a rotational force is not generated on the pointer 21C of the pointer section 21. As a result, inclining in the direction Fc (in FIG. 11) as in the related art invention does not occur in the invention, and thereby a deviation in indication of the pointer 21 is eliminated, and increase of a sliding friction between the upper pulleys 21P1 and the guide rail 22R or the lower pulley 21P2 and the guide rail 22R is prevented.

<Pointer Moving Device According to Second Embodiment of the Invention>

While the pointer moving device according to the first embodiment of the invention solving the problems of the related art invention is described above, the related art invention additionally has the following problems.

<<Problem 2 of Related Art Invention>>

The support member 210Z shown in FIG. 8 is constituted such that the first support member 210A and the second support member 210B sandwich the coil spring 210S and are integrally fitted to each other. However, when some sort of strong vibration occurs, there is a possibility that the second support member 210B comes off from the first support member 210A, and thereby the second support member 210B falls. When the second support member 210B falls, the entirety of the pointer attachment section finally falls from the guide rail 220R.

<<Improved Example of Pointer>>

Figure 12:
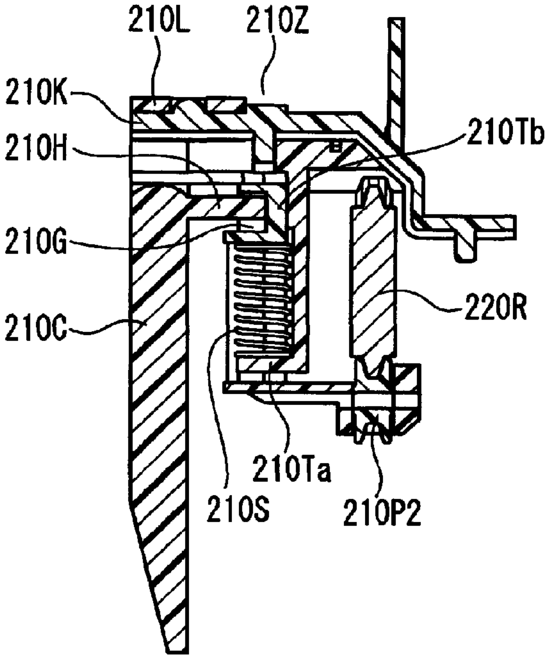
FIG. 12 is a vertical cross-sectional view showing the pointer moving device provided with an improved sample of a pointer shown in FIG. 8 according to the related art invention.
Figure 12:
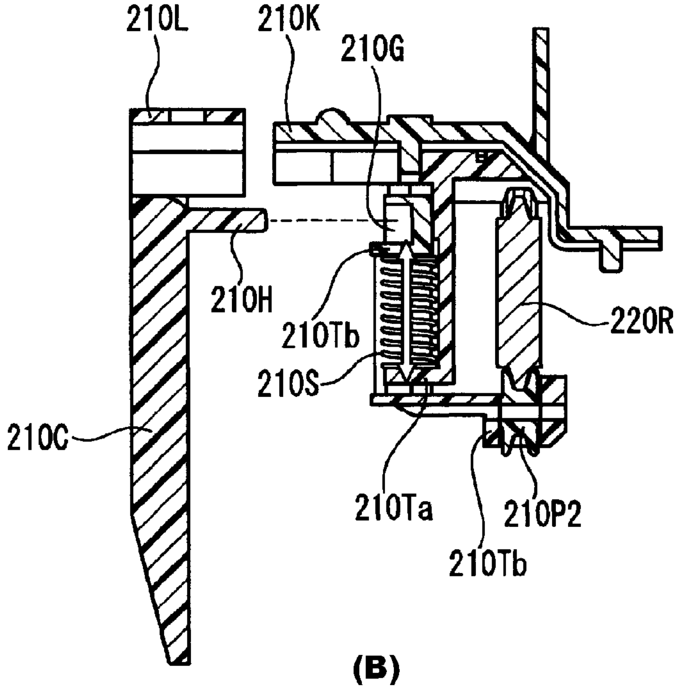

FIGS. 12(A) and 12(B) are schematic views showing an improved example capable of solving the problem of the pointer shown in FIG. 8.

In FIGS. 12(A) and 12(B), a boss 210H for stopper is formed on the pointer 210C at its upper portion. A recessed portion 210G for fitting is formed on a part of the abutment portion 210Ta into which the boss 210H for stopper enters in a state in which the pointer 210C is assembled to the pointer fixing section 210K. With this, even when a strong vibration occurs and the second support member 210B is going to come off from the first support member 210A so as to fall, the boss 210H for stopper at the upper portion of the pointer 210C is fitted to the recessed portion 210G for fitting of the abutment portion 210Ta as shown in FIG. 12(A) so that the second support member 210B is not able to fall.

<<Problems of Improved Example>>

However, a problem is found in the improved example. That is, a problem does not arise after the boss 210H for stopper is fitted to the recessed portion 210G for fitting of the abutment portion 210Ta, but a problem arises in the way of assembling. Since the pointer 210C is assembled at the last in the assembling sequence, there is a possibility that the entirety of the pointer attachment section comes off from the guide rail 220R so as to fall in the way of the assembling operation, before the boss 210H for stopper is fitted to the recessed portion 210G for fitting.

<Purpose of Second Embodiment>

The purpose of the second embodiment is to eliminate the above problem, and to provide a pointer moving device capable of preventing an entirety of a pointer attachment section from coming off from a guide rail even in the way of an assembling operation.

<Configuration of Second Embodiment>

Figure 13:
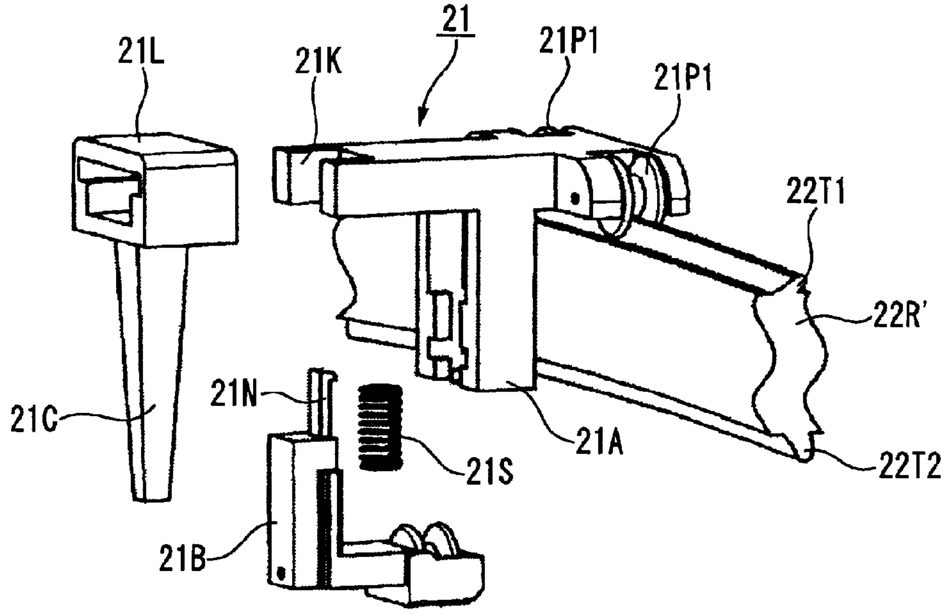
FIG. 13 is an exploded perspective view showing a pointer moving device according to a second embodiment of the invention.
Figure 14:
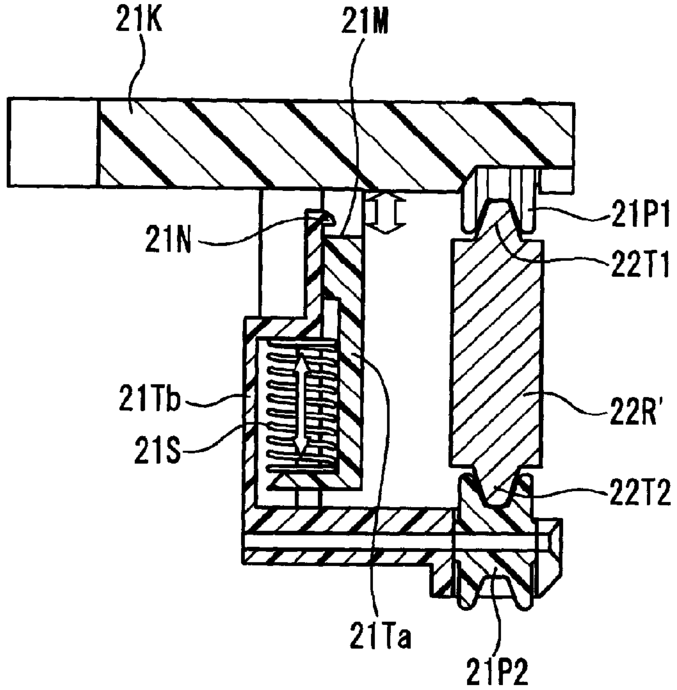
FIG. 14 is a vertical cross-sectional view showing the pointer moving device shown in FIG. 13.

In FIG. 13 of an exploded perspective view of a pointer moving device according to the second embodiment of the invention and FIG. 14 of a vertical cross-sectional view thereof, a pawl 21N for stopper is formed on the second support member 21B (in FIG. 13) which presses the upper portion of the coil spring 21S. A hole portion 21M for restriction (in FIG. 14) is formed on the first support member 21A at a portion where the hole portion 21M for restriction faces the pawl 21N for stopper in a state in which the first support member 21A (in FIG. 13) adapted to press the lower portion of the coil spring 21S and the second support member 21B are assembled with each other.

<Advantage of Second Embodiment>

With the above, downward moving of the second support member 21B is restricted in a state in which the pawl 21N for stopper of the second support member 21B is fitted to the hole portion 21M for restriction of the first support member 21A. As a result, even when the second support member 21B is going to come off from the first support member 21A to fall, it is not able to fall.

Thus, in accordance with the second embodiment, in the event when the first support member 21A is attached to the second support member 21B, it is possible to prevent the pointer attachment section from coming off from the guide rail 22R', even in a case where an outer force which is equal to or larger than a force pushing the guide rail 22R' by the tensile force of the coil spring 21S, acts in a direction opposite to the tensile force of the coil spring 21S.

<Combination of First Embodiment and Second Embodiment>

The first embodiment and the second embodiment described above are not conflict to each other but can be combined with each other. In FIGS. 3 and 4 showing the first embodiment, the pawl 21N for stopper of the second support member 21B and the hole portion 21M for restriction of the first support member 21A are described. The functions and effects of the pawl 21N for stopper and the hole portion 21M for restriction in FIGS. 3 and 4 are exactly the same as those of the pawl 21N for stopper and the hole portion 21M for restriction in FIGS. 13 and 14.

Thus, in accordance with the second embodiment, in the event when the first support member 21A is attached to the second support member 21B, it is possible to prevent the pointer attachment section from coming off from the guide rail 22R', even in a case where an outer force which is equal to or larger than a force pushing the guide rail 22R' by the tensile force of the coil spring 21S, acts in a direction opposite to the tensile force of the coil spring 21S.

Therefore, also in the first embodiment, by applying the second embodiment thereto, in the event when the first support member 21A is attached to the second support member 21B, it is possible to prevent the pointer attachment section from coming off from the guide rail 22R, even in a case where an outer force which is equal to or larger than a force pushing the guide rail 22R by the tensile force of the coil spring 21S, acts in a direction opposite to the tensile force of the coil spring 21S.

<Overview>

In accordance with the invention, a rotational force is not generated on the pointer of the pointer section, and thereby a deviation in indication of the pointer is eliminated and increase of a sliding friction between the upper pulley and the lower pulley is prevented.

In addition, in the event when the second support member is attached to the first support member, it is possible to prevent the pointer attachment section from coming off from the guide rail, even in a case where an outer force which is equal to or larger than a force pushing the guide rail by the tensile force of the coil spring, acts in a direction opposite to the tensile force of the coil spring.

Since the first support member is held by pressing the second support member against the guide rail by the tensile force of the spring, the pointer attachment section can be surely fixed while maintaining a characteristic of corresponding to a guide rail having a plurality of combined R-shapes.

Further, since the pointer attachment section is fixed to the guide rail before the pointer is attached so as to prevent the pointer attachment section from coming off, the assembling operability can be improved.

While the invention is described in detail by referring to specific embodiments, it is understood by those of ordinary skill in the art that various modifications and changes can be made without departing from the sprit and scope of the invention.

This application is based on Japanese Patent Application (JP-2010-110476) filed on May 12, 2010, and Japanese Patent Application (JP-2010-231767) filed on Oct. 14, 2010, the contents of which are incorporated herein by reference.

INDUSTRIAL APPLICABILITY

In accordance with the invention, since the force of the wire fixed to the wire fixing section acting on the pointer section is positioned on the same line as that of the force acting between the guide rail and the pulleys, a rotational force is not generated on the pointer of the pointer section and the pointer is not inclined. Therefore, the invention achieves the advantages that a deviation in indication of the pointer is eliminated and increase of a sliding friction between the pulleys and the guide rail is prevented.

DESCRIPTION OF REFERENCE NUMERALS AND SIGNS

10 center-less pointer type display apparatus according to the invention
20 pointer moving device
21 pointer section
21A first support member
21B second support member
21C pointer
21K pointer fixing section
21L opening portion for fixing
21P1, 21P2 pulley
21Q1, 21Q2 pulley shaft support section
21S coil spring
21W wire fixing groove
21Z support member (first support member 21A and second support member 21B)
21M hole portion for restriction
21N pawl for stopper
22 carrying section
22C tension component containing case
22L conductive component
22M motor
22P rewinding pulley
22S tension component
22R guide rail
22W wire
30 containing case
31 case body
31K semicircular opening portion
31T bottom section
32 dial plate
32K opening

The invention claimed is:

1. A center-less pointer type display apparatus comprising:

a pointer moving device that includes a pointer section which supports a pointer and a carrying section which carries the pointer section and is formed in a substantially semicircular arc or substantially ellipse shape; and a containing case that is formed of a case body which is covered by a semicircular shaped dial plate having an opening portion near its center, the containing case accommodating the pointer moving device so that the pointer indicates a scale on the dial plate, wherein the carrying section has a guide rail having a transverse U-shape in cross section and a wire which is moved along the guide rail;

wherein the pointer section has a first support member which supports an upper pulley and a second support member which supports a lower pulley, a spring is interposed between the first support member and the second support member so that a lower portion of the spring pushes the first support member and an upper portion of the spring pushes the second support member, and thereby the upper pulley on the first support member and the lower pulley on the second support member hold an upper portion and a lower portion of the guide rail, respectively; and wherein a wire fixing section adapted to fix the wire is provided at an intermediate portion of the pointer section on a line connecting the upper pulley and the lower pulley, and the wire is fixed to the wire fixing section.

2. The center-less pointer type display apparatus according to claim 1, wherein two pulleys are provided on the upper portion of the pointer section, and the lower pulley is provided on a perpendicular bisector connecting the two pulleys on the upper portion.

3. The center-less pointer type display apparatus according to claim 1, wherein a pawl for stopper is formed on the second support member and a hole portion for restriction is formed on the first support member, the pawl for stopper is inserted into the hole portion for restriction in a state that the first support member and the second support member are assembled with each other.

* * * * *